(12) United States Patent
Hillyard

(10) Patent No.: US 9,811,353 B1
(45) Date of Patent: Nov. 7, 2017

(54) REMOTELY INVOKING DYNAMIC CLASSES ON A COMPUTING DEVICE

(75) Inventor: Paul Byron Hillyard, Lindon, UT (US)

(73) Assignee: Crimson Corporation, Dover, DE (US)

( * ) Notice: Subject to any disclaimer, the term of this patent is extended or adjusted under 35 U.S.C. 154(b) by 688 days.

(21) Appl. No.: 12/980,861

(22) Filed: Dec. 29, 2010

Related U.S. Application Data

(60) Provisional application No. 61/368,971, filed on Jul. 29, 2010.

(51) Int. Cl.
| | |
|---|---|
| *G06F 9/445* | (2006.01) |
| *G06F 9/44* | (2006.01) |
| *G06F 9/455* | (2006.01) |
| *G06F 9/54* | (2006.01) |
| *G06F 17/30* | (2006.01) |

(52) U.S. Cl.
CPC .......... *G06F 9/445* (2013.01); *G06F 9/44521* (2013.01); *G06F 9/547* (2013.01); *G06F 9/548* (2013.01); *G06F 9/443* (2013.01); *G06F 9/4428* (2013.01); *G06F 9/44526* (2013.01); *G06F 9/45504* (2013.01); *G06F 17/30607* (2013.01)

(58) Field of Classification Search
CPC .. G06F 9/445; G06F 9/44521; G06F 9/44526; G06F 9/547
See application file for complete search history.

(56) References Cited

U.S. PATENT DOCUMENTS

| | | | | |
|---|---|---|---|---|
| 5,504,892 A | * | 4/1996 | Atsatt | G06F 17/30607 707/822 |
| 5,613,120 A | * | 3/1997 | Palay et al. | 717/165 |
| 5,615,400 A | * | 3/1997 | Cowsar | G06F 9/4428 711/118 |
| 5,682,536 A | * | 10/1997 | Atkinson et al. | 717/165 |
| 6,029,207 A | * | 2/2000 | Heninger | G06F 9/4428 717/163 |
| 6,044,224 A | * | 3/2000 | Radia et al. | 717/162 |
| 6,381,742 B2 | * | 4/2002 | Forbes et al. | 717/176 |

(Continued)

OTHER PUBLICATIONS

Hjalmtysson, Gray, "Dynamic C++ Classes A lightweight mechanism to update code in a running program", USENIX Annual Technical Conference , 1998; [retrieved on Apr. 10, 2013]; Retrieved from Internet <URL:http://citeseerx.ist.psu.edu/viewdoc/download?doi=10.1.1.30.6578&rep=rep1&type=pdf>;pp. 1-13.*

(Continued)

*Primary Examiner* — Geoffrey St Leger

(57) ABSTRACT

A computing device that is configured for remotely invoking dynamic classes is described. The computing device includes a processor, memory in electronic communication with the processor and instructions stored in the memory. The computing device deploys one or more assemblies, which are used by an unreferenced derived class. A byte array that includes the unreferenced derived class is received from a remote node. The unreferenced derived class includes an implementation of a common base class. The computing device further receives a class name and one or more assembly names from the remote node. The computing device decodes the byte array to reconstitute the unreferenced derived class and calls the implementation of the common base class. One or more operations may be performed with the unreferenced derived class.

19 Claims, 9 Drawing Sheets

(56) References Cited

U.S. PATENT DOCUMENTS

| | | | | |
|---|---|---|---|---|
| 6,438,616 | B1* | 8/2002 | Callsen et al. | 719/316 |
| 6,473,773 | B1* | 10/2002 | Cheng | G06F 9/4428 707/814 |
| 6,487,714 | B1* | 11/2002 | Azagury et al. | 717/116 |
| 6,499,137 | B1* | 12/2002 | Hunt | 717/164 |
| 6,553,428 | B1* | 4/2003 | Ruehle et al. | G06F 9/547 719/330 |
| 6,810,519 | B1* | 10/2004 | Hicks | 717/166 |
| 6,928,488 | B1* | 8/2005 | de Jong et al. | 709/246 |
| 6,976,261 | B2* | 12/2005 | Callsen et al. | 719/316 |
| 7,043,723 | B2* | 5/2006 | Briggs | 717/165 |
| 7,240,329 | B1* | 7/2007 | Long et al. | 717/116 |
| 7,523,444 | B2* | 4/2009 | Quinn et al. | 717/120 |
| 7,533,389 | B2* | 5/2009 | Verbeke et al. | 719/332 |
| 8,185,889 | B2* | 5/2012 | Kinder et al. | 717/174 |
| 8,458,300 | B2* | 6/2013 | Rive et al. | H04L 41/5096 717/168 |
| 2001/0047401 | A1* | 11/2001 | McTernan et al. | 709/219 |
| 2002/0016864 | A1* | 2/2002 | Brett | G06F 9/4433 719/315 |
| 2003/0115379 | A1* | 6/2003 | Burton | G06F 9/548 719/330 |
| 2004/0049765 | A1* | 3/2004 | Hasha | 717/116 |
| 2005/0044541 | A1* | 2/2005 | Parthasarathy et al. | 717/173 |
| 2007/0067769 | A1* | 3/2007 | Geisinger | 718/1 |
| 2007/0234337 | A1* | 10/2007 | Suzuki et al. | 717/168 |
| 2008/0320465 | A1* | 12/2008 | Kinder et al. | 717/170 |
| 2010/0293283 | A1* | 11/2010 | Andrade et al. | 709/230 |
| 2011/0107300 | A1* | 5/2011 | Vidal et al. | 717/121 |
| 2012/0005651 | A1* | 1/2012 | Lee | 717/107 |

OTHER PUBLICATIONS

Brekken, L. A., Adaptation in .NET, Norwegian University of Science and Technology, 2005, 8 pages, [retrieved on Jun. 9, 2017], Retrieved from the Internet: <URL:https://pdfs.semanticscholar.org/d503/de71f6cd03111724b3a39bc1356c102499d9.pdf>.*

Newsome, M., et al., Proxy Compilation of Dynamically Loaded Java Classes with MoJo, Proceedings of the joint conference on Languages, compilers and tools for embedded systems: software and compilers for embedded systems, Jun. 19-21, 2002, pp. 204-212, [retrieved on Jun. 9, 2017], Retrieved from the Internet: <URL:http://dl.acm.org/>.*

* cited by examiner

REMOTELY INVOKING DYNAMIC CLASSES ON A COMPUTING DEVICE

RELATED APPLICATIONS

This application is related to and claims priority from U.S. Provisional Patent Application Ser. No. 61/368,971, filed Jul. 29, 2010, for "REMOTELY INVOKING DYNAMIC CLASSES ON A COMPUTING DEVICE," with inventor Paul Byron Hillyard, which is incorporated herein by reference.

TECHNICAL FIELD

The present disclosure relates generally to computers and computer-related technology. More specifically, the present disclosure relates to remotely invoking dynamic classes on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. One or more managing servers or computers may provide data, services and/or may be responsible for managing other computers on a network. The managed computers are often referred to as managed nodes. A computer network may have hundreds or even thousands of managed nodes.

It is often desirable to remotely change or improve the behavior of a managing server or computer. However, current technology does not adequately address this desirable feature. When a change or improvement is desired, computer programmers or developers must often rewrite software on the managing server or computer.

As shown from the above discussion, there is a need for systems and methods that will improve the ability to remotely invoke dynamic classes on a computing device. Improved systems and methods are disclosed herein that enable a computing device to remotely invoke dynamic classes.

DETAILED DESCRIPTION

Figure 1:
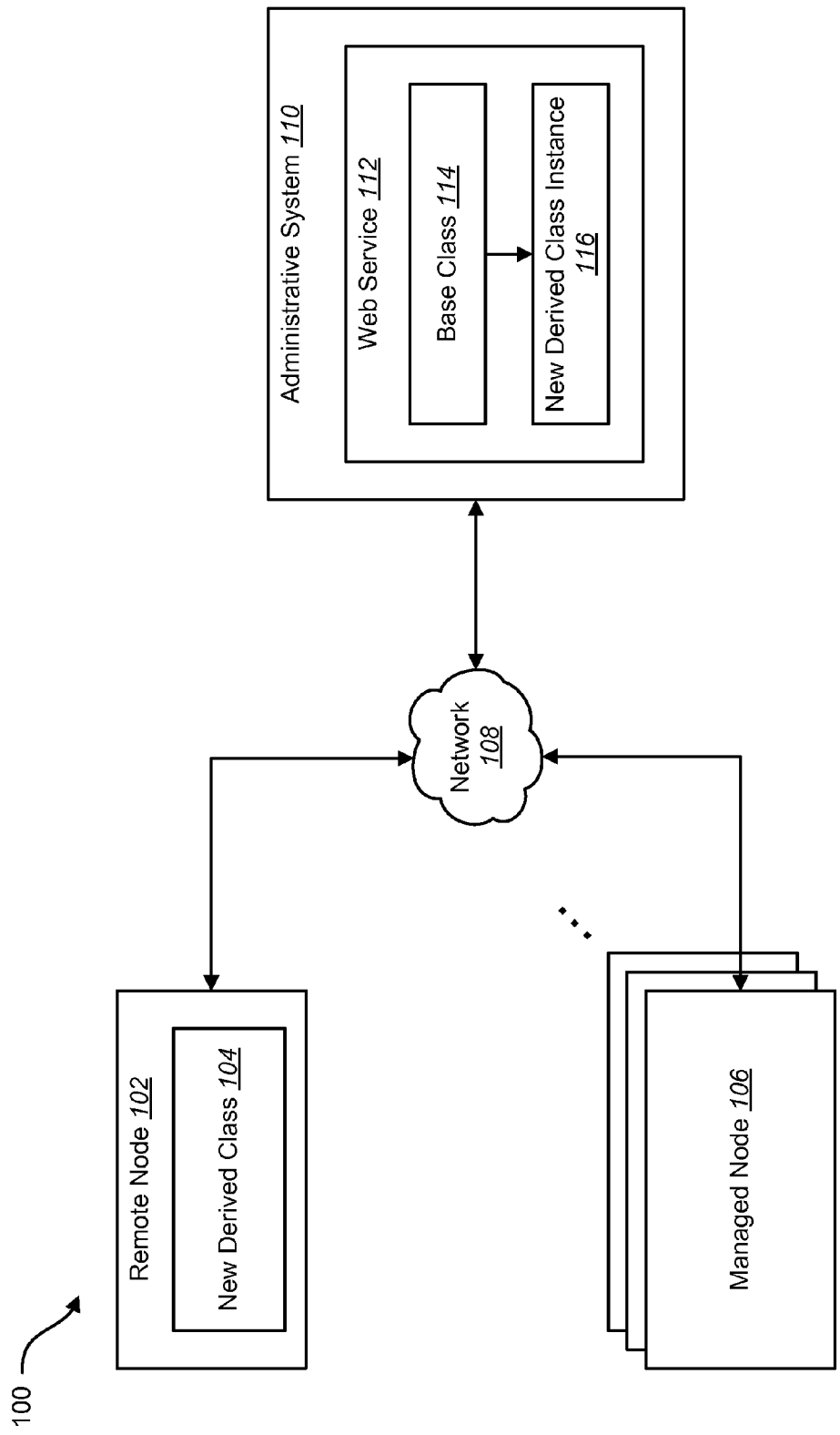
FIG. 1 is a block diagram illustrating one configuration of a system in which systems and methods for remotely invoking dynamic classes on a computing device may be implemented.

The systems and methods disclosed herein may use a set of predefined web service methods to manage access to software classes that are derived from a common base class. Object-oriented programming technologies allow programmers to write derived classes (e.g., "subclasses") of base classes. Microsoft's .NET framework is one example where such functionality is allowed.

However, limitations in some programming technologies (e.g., .NET) do not allow remotely-called parameters to be interface specifications. Because of these limitations, remotely-called parameters must consist of actual class definitions that do not include any abstract methods. Furthermore, programming code that makes use of later-referenced derived classes via a remote interface is typically required to include certain coding along with the base class definition that designates all possible derived classes that might be passed remotely (e.g., and/or deserialized). This means that the implementer of a web service that handles objects derived from the base class must include references to all assemblies that might derive from that class and must know about each of the possible classes at build time (e.g., of the web service). As a result of these limitations and requirements, the current technology is not very dynamic.

More specifically, .NET requires the foreknowledge of a class and method before it can remotely invoke a class at runtime. This shortcoming can be avoided by sending assembly and class names along with a byte stream (e.g., serialized version) of the new derived class. This approach allows new derived classes to be created after a web service is deployed (i.e., so long as the assemblies associated with those classes are added to the web service installation).

A computing device that is configured for remotely invoking dynamic classes on a computing device is disclosed. The computing device includes a processor and instructions stored in memory that is in electronic communication with the processor. The computing device deploys one or more assemblies. The one or more assemblies are used by an unreferenced derived class. The computing device also receive a byte array from a remote node. The byte array includes the unreferenced derived class and the unreferenced derived class includes an implementation of a common base class. The computing device further receives a class name from the remote node. The computing device also receives one or more assembly names from the remote node. The computing device additionally decodes the byte array to reconstitute the unreferenced derived class. The computing device also calls the implementation of the common base class. The computing device further performs one or more operations with the unreferenced derived class. Calling the implementation of the common base class may instantiate the unreferenced derived class. The common base class may include a decoder used to decode the byte array to reconstitute the unreferenced derived class.

The computing device may not include a description of the unreferenced derived class and may not include a reference to one or more assemblies used by the unreferenced derived class at the build time of a web service on the computing device. The computing device may not allow remote instantiation of a derived class without one or more assembly references and a description of the derived class at the build time of a web service.

The unreferenced derived class may include one or more records in a database on the computing device. The unreferenced derived class may include one or more files in a file system on the computing device. The unreferenced derived class may be used to modify how the computing device manages managed nodes on a network.

The common base class may include one or more methods. The unreferenced derived class may implement the one or more methods included in the common base class. The one or more methods may include a save method and a load method.

A computing device that is configured for remotely invoking dynamic classes on a computing device is also disclosed. The computing device includes a processor and instructions stored in memory that is in electronic communication with the processor. The computing device encodes an unreferenced derived class into a byte array. The unreferenced derived class includes an implementation of a common base class. The computing device also sends the byte array to another computing device. The computing device further sends a class name to the other computing device. The computing device additionally sends one or more assembly names to the other computing device. The computing device may also send one or more assemblies. The one or more assemblies may be used by the unreferenced derived class. The other computing device may be an administrative system.

A method for remotely invoking dynamic classes on a computing device is also disclosed. The method includes deploying one or more assemblies on the computing device. The one or more assemblies are used by an unreferenced derived class. The method also includes receiving a byte array from a remote node. The byte array includes the unreferenced derived class and the unreferenced derived class includes an implementation of a common base class. The method further includes receiving a class name from the remote node. The method additionally includes receiving one or more assembly names from the remote node. The method also includes decoding, on the computing device, the byte array to reconstitute the unreferenced derived class. The method further includes calling, on the computing device, the implementation of the common base class. Also, the method includes performing one or more operations with the unreferenced derived class on the computing device.

A method for remotely invoking dynamic classes on a computing device is also disclosed. The method includes encoding an unreferenced derived class into a byte array on a computing device. The unreferenced derived class includes an implementation of a common base class. The method also includes sending, from the computing device, the byte array to another computing device. The method additionally includes sending, from the computing device, a class name to the other computing device. Furthermore, the method includes sending, from the computing device, one or more assembly names to the other computing device.

A non-transitory tangible computer-readable medium for remotely invoking dynamic classes on a computing device is also disclosed. The computer-readable medium includes executable instructions for deploying one or more assemblies. The one or more assemblies are used by an unreferenced derived class. The computer-readable medium also includes executable instructions for receiving a byte array from a remote node. The byte array includes the unreferenced derived class and the unreferenced derived class includes an implementation of a common base class. The computer-readable medium further includes executable instructions for receiving a class name from the remote node. The computer-readable medium also includes executable instructions for receiving one or more assembly names from the remote node. Executable instructions are also included on the computer-readable medium for decoding the byte array to reconstitute the unreferenced derived class. The computer-readable medium additionally includes executable instructions for calling the implementation of the common base class.

A non-transitory tangible computer-readable medium for remotely invoking dynamic classes on a computing device is also disclosed. The computer-readable medium includes executable instructions for encoding an unreferenced derived class into a byte array. The unreferenced derived class includes an implementation of a common base class. The computer-readable medium further includes executable instructions for sending the byte array to another computing device. The computer-readable medium also includes executable instructions for sending a class name to the other computing device. The computer-readable medium additionally includes executable instructions for sending one or more assembly names to the other computing device.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 in which systems and methods for remotely invoking dynamic classes on a computing device may be implemented. A remote node 102, one or more managed nodes 106 and an administrative system 110 may each be connected to a network 108. Examples of the network 108 include a Local Area Network (LAN), Wide Area Network (WAN) or the Internet.

The administrative system 110 may manage the managed nodes 106. In one example configuration, the administrative system 110 sends commands to the managed nodes 106 to perform certain operations. These operations may include downloading software or data, installing new software, patches or updates, uninstalling unauthorized software, scanning the managed node 106 for viruses, spyware, adware or other security threats, etc. In other words, the administrative system 110 may be used to manage and/or maintain the managed nodes 106. The administrative system 110 may be implemented as a computing device or group of computing devices, such as Personal Computers (PCs) or servers.

The administrative system 110 may include a web service 112. The web service 112 may be a computer program that handles transactions and/or communications with the remote node 102 and/or managed nodes 106. The web service 112 may include a base class 114. The base class 114 may comprise computer code or software that provides a class definition and/or certain functionality. For example, a base class may include definitions of methods and (default) implementations of those methods.

The remote node 102 may be a managed node 106 or may be separate from the managed nodes 106. The remote node 102 may include a new derived class 104. The new derived class 104 may be a computer program class that provides method implementations to and derives from (e.g., or implements) the base class 114. This new derived class 104 may be unreferenced by the web service 112. In other words, the web service 112 may not include a reference to assemblies used by the new derived class 104 and may not include a description of the new derived class 104. Thus, new derived classes may be and/or be referred to as "unreferenced" or "dynamic" classes since they can be dynamically called without being referenced at build time.

In one configuration of the systems and method disclosed herein, the new derived class 104 will only be able to get methods called that were defined in the base class 114 (since they are being called remotely). Those methods may be called on the new object (e.g., the new derived class instance 116) that may have not been defined when the web service 112 was built. For example, the base class 114 object is of an "Exportable" type. This means that the object (e.g., new derived class instance 116) may be imported and exported to a file or to a byte stream over the network 108. The new derived class instance 116 may also implement methods necessary to control loading/saving itself to a database table (or multiple tables). In one example, new objects of "Exportable" type (e.g., new derived class instance 116) may be defined, such as a "Task." "Task" may not have existed when the web service 112 was defined. To support this, a web service method may be implemented for each method in "Exportable" (e.g., the base class 114). However, each web service 112 method may allow the specification of a byte stream that represents the serialized version of the derived class "Task" (e.g., new derived class instance 116). For example, assume that there is a method called Exportable.SaveToDatabase ("some-save-options"), where "some-save-options" may be information (e.g., inputs) used in the method. The web service 112, along with the proxy on the client-side may implement a version called WebService.SaveExportableToDatabase (byte[ ] exportable, "some-save-options"). That method may be able to deserialize the Exportable object (e.g., new derived class instance 116), determine that it is a "Task" and call the task instance's version of SaveToDatabase ("some-save-options"). In one configuration, prior to calling this method, another method may be called to ensure that the assembly that implements "task" has been registered by the web service 112 and that the web service 112 knows to browse this assembly looking for types derived from "Exportable." For instance, the web service 112 may find files in a shared directory based on a database configuration that lists all the assemblies and the implemented classes that derive from "Exportable."

According to the systems and methods disclosed herein, the remote node 102 may serialize the new derived class 104 into a byte stream and send it to the administrative system 110 over the network 108. The web service 112 may receive and deserialize the new derived class 104. The new derived class 104 may be used to provide the method implementation(s) for the base class 114. The web service 112 may use this deserialized new derived class 104 and the base class 114 to produce a new derived class instance 116. The new derived class instance 116 can then perform some operation on the administrative system 110.

For example, the systems and methods disclosed herein may be used to store different database or file system objects derived from a common base class. In one example, a base class 114 includes a load method. In one configuration, the load method may be used for loading, saving and/or finding objects that have been stored in the administrative system's 110 database and/or file system via the web service 112. For instance, the load method may be used to change scanning settings for the managed nodes 106. For example, an object may include scan settings. Assume that this object is called "AgentBehavior" and is derived from "Exportable." This "AgentBehavior" object may have a "SaveToDatabase" method and a "LoadFromDatabase" method (in addition to other methods). The "SaveToDatabase" method (defined in "Exportable" as a virtual, overridable method), is overridden by "AgentBehavior" to include also writing an Extensible Markup Language (XML) file out to the file system of the administrative system 110. In this way, managed nodes 106 may be able to download the latest copy of the "AgentBehavior" file whenever it has been saved to the database. This allows the directory in which agent behavior files are stored to be secured from remote write access (only the local web service 112 can write to it, for example).

Assume, for example, that the name of a virus file is desired to be added to scanning settings such that the administrative system 110 will command the managed nodes 106 to scan for an additional virus. In this example, a user wants to make the change from the remote node 102. However, the web service 112 does not include a specific web service method that directly exposes remote access to the save method for a scanning class. In accordance with the systems and methods disclosed herein, the user may create a new derived class 104 that implements the save method in the base class 114 in order to make the desired change. This new derived class 104 is serialized, sent across the network 108 to the web service 112, which deserializes the new derived class 104. The new derived class 104 is used in conjunction with the base class 114 to create a new derived class instance 116. The new derived class instance 116 then makes the desired change to the scanning settings by adding the virus definition to a database. At some point, the administrative system 110 then sends a command to the managed nodes 106 to scan for viruses, using the latest saved settings at the administrative system 110. It should be noted that the new derived class' 104 implementation of a save method may perform various actions implied during the save. For example, these various actions may include some kind of file system writing and/or publishing of information along with a database update.

Figure 2:
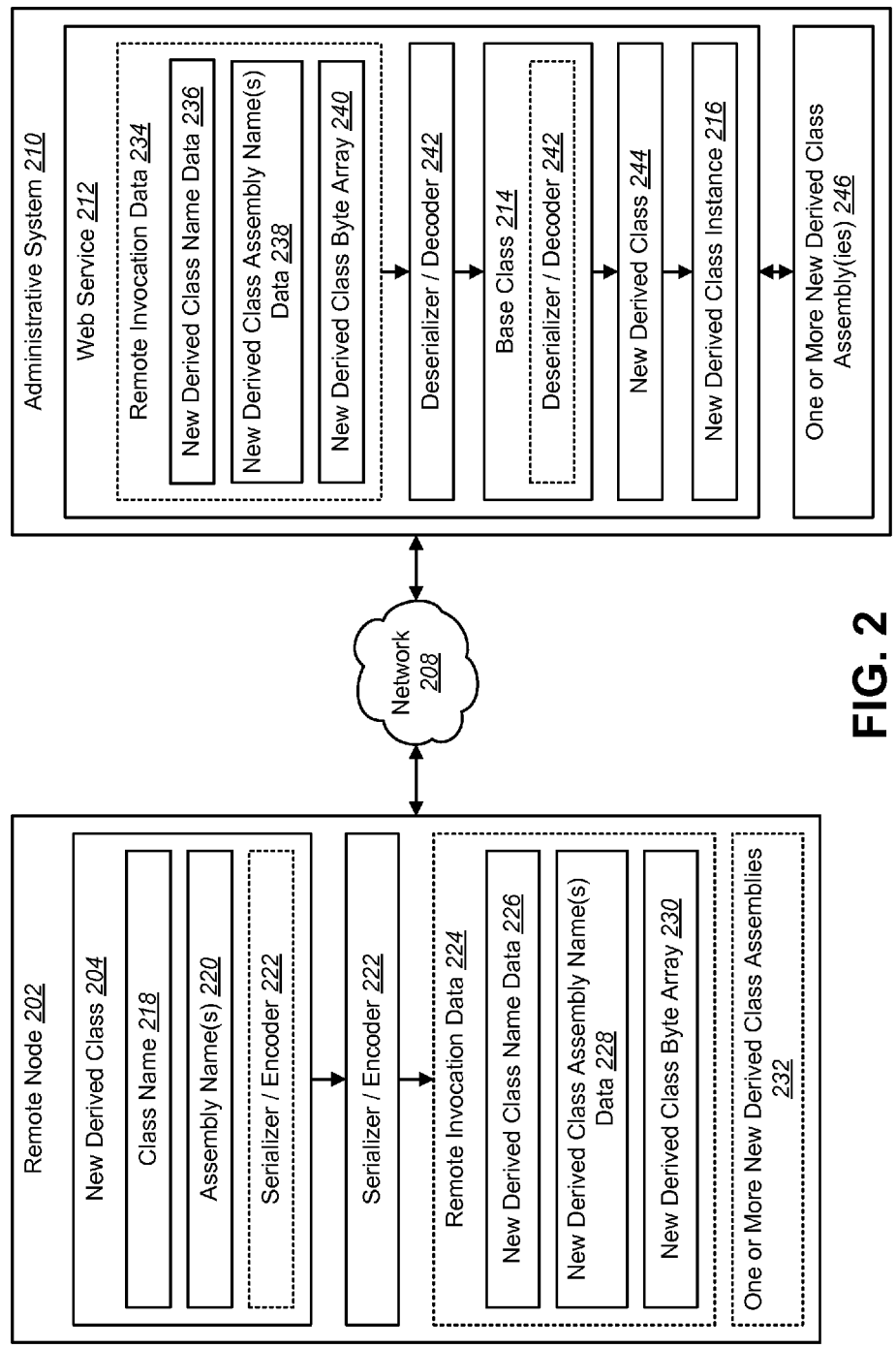
FIG. 2 is a block diagram illustrating another configuration of a system where systems and methods for remotely invoking dynamic classes may be implemented.

FIG. 2 is a block diagram illustrating another configuration of a system where systems and methods for remotely invoking dynamic classes may be implemented. The remote node 202 includes a new derived class 204, a serializer or encoder 222, remote invocation data 224 and (optionally) one or more new derived class assemblies 232.

The new derived class 204 may include a class name 218 and assembly name(s) 220. It may optionally include a serializer or encoder 222. In one configuration, the systems and methods disclosed herein may employ Microsoft's .Net framework. One advantage of .Net is that a serializer/deserializer is common. The derived class 204 may just need to be "listed" as a possible type when calling the deserializer.

Thus, this new derived class 204 may need to be loaded and/or listed before the deserializer is called. This may be accomplished by loading an instance of the new derived class 204 from a dynamic assembly and then passing this new derived class 204 to the deserializer built into .Net. Any other special deserialization logic may be defined in the new derived class 204 itself by using the "Attributes" of XML serialization that may precede the fields and properties of the new derive class 204 (in code).

The class name 218 is the programmatic name of the new derived class 218. The one or more assembly names 220 are the names of one or more assemblies used by the new derived class 204 to operate. An assembly may comprise one or more dynamic link library (e.g., "DLL") files. More specifically, the one or more assemblies (i.e., and the dynamic link library files) may comprise a library of shared functions used by the new derived class 204. For example, the one or more assemblies themselves may be delivered to a computing device (e.g., administrative system 210) hosting the web service 212. Once the assemblies are delivered and stored in some "common" location (e.g., in the Global Assembly Cache (GAC)) on that computing device (e.g., administrative system 210), the top-level assembly (that claims to host the new derived class 244) may be loaded. The administrative system 210 may attempt to instantiate the new derived class 244 to produce a new derived class instance 216 such that its type information may be used for later deserialization of other objects of the same type.

The serializer or encoder 222 may be a software module used to serialize the new derived class 204 into a byte array or byte stream. For example, a byte array or byte stream may be a stream of bytes. Additionally or alternatively, a byte array or byte stream may be a stream of UTF-8 (Universal Character Set Transformation Format—8-bit) characters or other character set that allows the stream to be saved as a file and browsed with an XML editor. As illustrated in FIG. 2, the serializer or encoder 222 may be implemented as a module of the new derived class 204 or may optionally be implemented as a separate module. In one configuration, serialize/deserialize functionality is built into .Net and variable "attributes" may be used to control how fields and/or properties are serialized/deserialized.

It should be noted that the serializer/encoder 222 module can also be implemented to additionally deserialize or decode classes. Similarly, the deserializer/decoder 242 can be implemented to additionally serialize or encode classes. This may enable bidirectional communication of the new derived class 204 between the remote node 202 and the administrative system 210. For convenience, the remote node 202 is illustrated as including just a serializer 222, while the administrative system 210 is illustrated as including just a deserializer 242. As used herein, "encoding" or variants thereof may be analogous to "serializing" and "decoding" or variants thereof may be analogous to "deserializing." Additionally or alternatively, "encoding" may be performed during serialization and "decoding" may be performed during deserialization. For example, encoding and/or decoding may be used to treat special characters when serializing to a text file. For instance, when writing to a text file (serializing), a "carriage return/line feed" combination may be "encoded" as a "\r\n", [CR] [LF] or something else perhaps. However, it would need to be "decoded" later when deserializing.

In one configuration, the web service 212 may support the ability to perform a deserialization when passed an object and support the ability to call methods on it. Additionally, for example, the web service 212 may support a serialize function if a WebService.LoadExportableFromDatabase ("exportable_type_name", "optional_assembly_info") method is called, where "exportable_type_name" may indicate the name of the "Exportable"-type and "optional_assembly_info" may give some indication of a corresponding assembly. The web service 212 may instantiate an "Exportable"-type object to help in loading from the database and return to the caller the byte stream representing a serialized copy of the returned object.

The remote invocation data 224 may include new derived class name data 226, new derived class assembly name(s) data 228 and a new derived class byte array 230. Generally, the remote invocation data 224 is formatted for transmission across the network 208. The new derived class name data 226 represents the class name 218, while the new derived class assembly name data 228 represents the assembly name 220. The new derived class byte array 230 is the new derived class 204 that has been serialized into a byte array by the serializer or encoder 222. The remote invocation data 224 is thus formatted such that it may be transmitted across the network 208 and processed by the web service 212.

The one or more new derived class assemblies 232 may be included on the remote node 202. For example, the new derived class assemblies 232 may be transmitted across the network 208 and stored on the administrative system 210 in order to provide the new derived class 204 with assembly data.

The administrative system 210 may include a web service 212 and one or more new derived class assemblies 246. The new derived class assemblies 246 may be deployed from the remote node 202 or from some other location. The web service 212 may include remote invocation data 234, a deserializer or decoder 242, a base class 214, a new derived class 244 and a new derived class instance 216. The remote invocation data 234 may be received from the remote node 202 and may include new derived class name data 236, new derived class assembly name(s) data 238 and a new derived class byte array 240. The new derived class name data 236 identifies the new derived class 244. Additionally, the new derived class assembly name(s) data 238 identifies the one or more new derived class assemblies 246 on the administrative system 210.

The new derived class byte array 240 may be deserialized by the deserializer or decoder 242. The deserializer or decoder 242 may be implemented as a separate module, or optionally may be included in the base class 214. In one configuration, the deserialize functionality may be provided by the Microsoft .Net framework. In that case, the deserialize functionality may be prepared (e.g., instantiated) and provided with an indication of where to load instances of types from. That is, the base class 214 can implement the serialize/deserialize methods such that they are only implemented once. This deserializer or decoder 242 thus converts (e.g., or reconstitutes) the new derived class byte array 240 to the new derived class 244.

The new derived class 244 may implement methods included in the base class 214. Although only one new derived class 204 is shown in FIG. 2, the "common" base class 214 may be implemented by one or more new derived classes 204. Using the deserialized new derived class 244 (e.g., and class name 236 and assembly name(s) data 238), the base class 214 and the new derived class assemblies 246, the administrative system 210 may generate a new derived class instance 216. The new derived class instance 216 may then perform some desired operation. For example, the new derived class instance 216 could perform an operation that modifies management functions. This modification could adjust scan and repair settings for the managed nodes 106 or could change when a maintenance task is scheduled (e.g., changing an operating system update from Tuesday at midnight to Friday at midnight), for example. This may be accomplished in some cases because this information is may be saved within the new derived class instance 216 itself. Thus, calling "Load" and/or "Save" methods on the object (e.g., derived class instance 216) may allow remote entities (e.g., a remote node 202) to get at and store new versions of this new object (e.g., new derived class instance 216) type.

Figure 3:
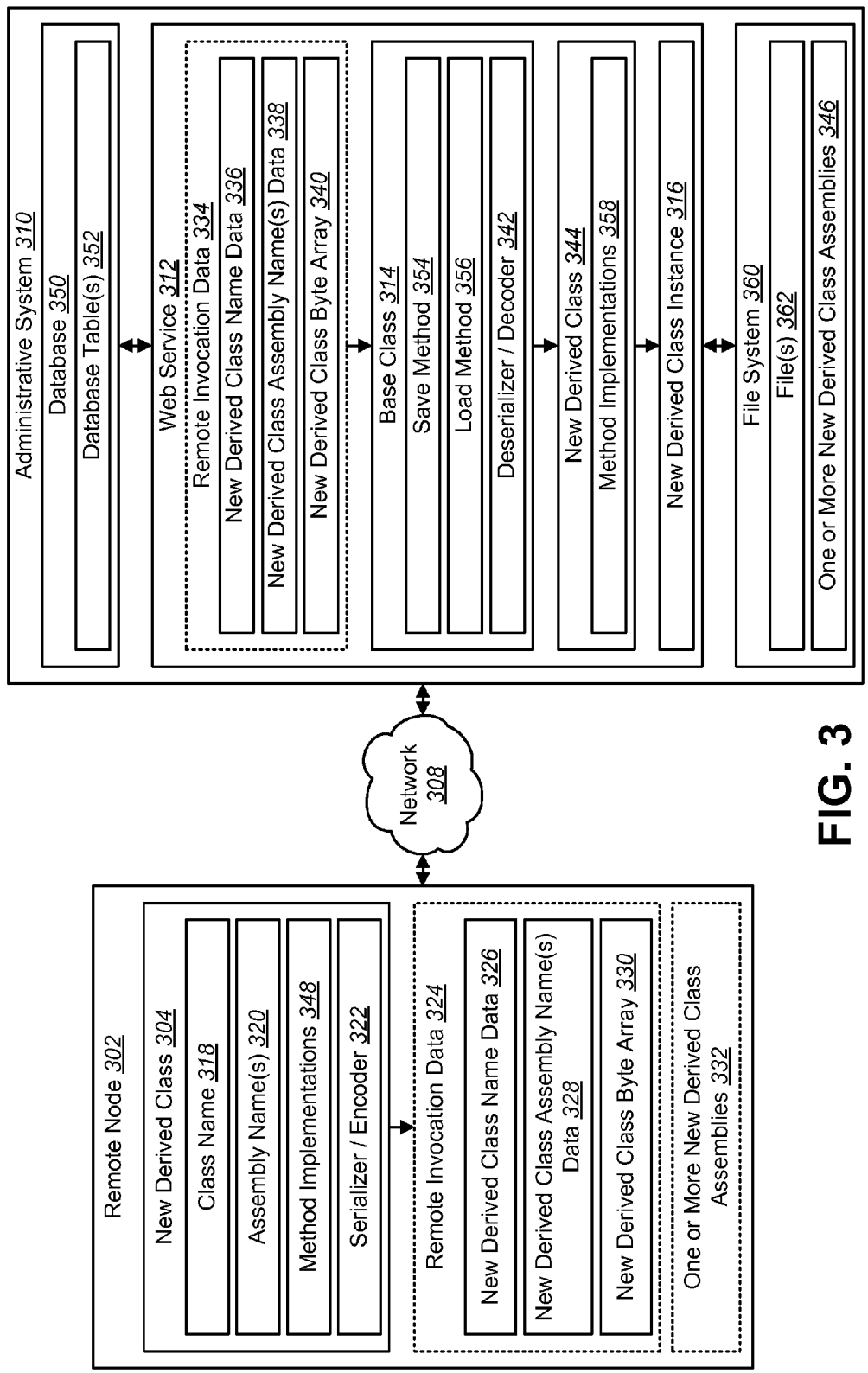
FIG. 3 is a block diagram illustrating another configuration of a system where systems and methods for remotely invoking dynamic classes may be implemented.

FIG. 3 is a block diagram illustrating another configuration of a system where systems and methods for remotely invoking dynamic classes may be implemented. The remote node 302 may include a new derived class 304, remote invocation data 324 and one or more new derived class assemblies 332. The class name 318 is the programmatic name of the new derived class 304, while the assembly name(s) 320 identify the one or more new derived class assemblies 332, 346 used by the new derived class 304 to function. The one or more new derived class assemblies 332 may be generated and sent from the remote node 302 to the administrative system 310.

The new derived class 304 may include method implementations 348. A method implementation is computer program code or instructions that specify how a computing device should operate in order to execute the method. In one configuration, the base class 314 on the administrative system 310 includes a save method 354 and a load method 356. The save method 354 and load method 356 may be abstract methods (i.e., they only contain method descriptions or signatures but no implementation) or they may contain default method implementations. In either case, the save method 354 and the load method 356 can be implemented (e.g., or "overridden") by the method implementations 348. In other words, the method implementations 348 provide the computer instructions or code for the execution of the save method 354 and load method 356.

As discussed above, the serializer 322 may serialize the new derived class 304 into a new derived class byte array 330 for transmission over the network 308 to the administrative system 310. The new derived class name data 326 and the new derived class assembly name(s) data 328 may be extracted from the new derived class 304. The remote invocation data 324 may thus be formatted for transmission and sent to the administrative system 310.

The administrative system 310 may include a database 350, a file system 360 and a web service 312. The web service 312 may include received remote invocation data 334, a base class 314, a new derived class 344 and a new derived class instance 316. In one configuration, the remote invocation data 334 includes new derived class name data 336, new derived class assembly name(s) data 338 and a new derived class byte array 340. All of this data 334 may be received from the remote node 302 via the network 308. Additionally, the one or more new derived class assemblies 346 may be received from the remote node 302 and stored in the file system 360.

Previous to receiving any remote invocation data 334, the base class 314 may have been programmed as part of the web service 312. In this case, the web service 312 may not include any reference to the new derived class 344 or any reference to the one or more new derived class assemblies 346 that may be needed to generate a new derived class instance 316. In short, the web service 312 may have no specific "foreknowledge" (i.e., assembly 346 references or new derived class 344 descriptions) of the new derived class 304, 344 at build time. In some default configurations (e.g., the Microsoft .NET framework), remote instantiation of an unreferenced derived class may not be permitted. For example, the .NET framework will not deserialize derived classes that were not described when the base class was defined. Rather, a statement like the one shown in Listing 1 below is typically required.

[XmlIncludeAttribute(typeof(derivedClass))]

Listing 1

A statement similar to the one shown in Listing 1 is typically placed above the class definition of the base class 314 before compilation and deployment of an assembly. However, the systems and methods disclosed herein include a mechanism to bypass this requirement. This allows new derived classes 304 to be created after the web service 312 is deployed that may still be handled by the web service 312. That is, by adding an additional encode/decode step when passing serializable objects (e.g., the new derived class 304) to and from the web service 312, objects can be passed that are derived from a common base class 314 that were not known about at the build time of the web service 312.

The new derived class byte array 340 may be deserialized or decoded by the deserializer/decoder 342. This may reconstitute the new derived class 344 along with its method implementations 358 on the administrative system 310. As previously mentioned, the method implementations may implement, for example, the save method 354 and the load method 356. Listing 2 below illustrates an example of a save method 354 included in the web service 312. In this example, the web service 312 method is used to retrieve an Exportable object (e.g., something derived from an "Exportable" class as will be discussed in more detail below).

[WebMethod]
public string SaveExportableToDatabase(byte[ ] bytes,
   string assemblyname, string classname, bool
faillfRevisionsDontMatch, bool saveAllReferences)
{
  try
  {
    Exportable    e=Exportable.ImportFromByteArray
      (bytes, assemblyname, classname);

Listing 2

In one configuration, it may be assumed that all classes are derived from "Exportable" as described above, which may allow a class to load and/or save itself to a database. The base class 314 may include helper logic to make it easy to "save" and "load" the new derived class 344 (or a new derived class instance 316, for example) when it comprises fields and/or properties. For example, the fields and/or properties (of an object or a new derived class instance 316) may be saved to a single row in a database. In one configuration, each "Exportable" class or object may be assumed to have a unique identifier (or that is at least unique for that type of object). This unique identifier may be a Globally Unique Identifier (GUID). This identifier may indicate whether to overwrite an object and whether an object has had its name changed but is still the same object. In Listing 2, the "faillfRevisionsDontMatch" feature is one way to indicate that this object may be saved only if no other entity has saved it since it was loaded (and obtained the revision, for example). Then, the save operation may be assumed to increment the revision to a new value. Thus, the "faillfRevisionDontMatch" may provide a rudimentary change control capability.

"saveAllReferences" may indicate whether to save all of the information embedded in a new derived class instance 316. In another configuration, "saveAllReferences" may be enhanced to a "LoadSaveLevel." "LoadSaveLevel" may indicate whether to save just the attributes as found in the base class 314, all attributes that would be a row in the database, update references to other objects that might be "pointed to" by the new derived class instance 316 (e.g., a "Task" might point to a "Query" object as a potential target for the task), and finally, whether to save all referenced information embedded in the new derived class instance 316 (e.g., "Exportable"). The base "Exportable" class (e.g., base class 314) may have the ability to seek any referenced "Exportable" objects that are referenced as properties or fields in the object that is being saved. If requested, the base class 314 (e.g., in an "OnSaveToDB" event) may find these other fields and/or properties and save them first (on a save level 4, for example, which may be the highest, most inclusive save level). The base class 314 may then save the object in question. This may be advantageous if the actual save of the object in question requires a foreign key reference to an auto-increment value on the referenced class. For example, assume that a "task" object (e.g., new derived class instance 316) points to a query object called "MyQuery1," which gets saved to record location Query_Idn=56. As long as the query is saved first, then the "OnSaveToDB" handler for the "task" object can make sure that its own property called "query_idn" is set to 56 before the base class 314 auto-saves each of its public properties. Listing 3 illustrates one configuration of load/save level definitions.

```
public enum DBLoadSaveLevel
{
   ExportableOnly=0,
   BaseClassOnly=0,
   DerivedClass=1,
   OneToManyRelationships=2,
   Everything=3
}
```

Listing 3

Listing 4 below illustrates an example of an ImportFromByteArray method shown in Listing 2 (e.g., which may use the system's deserialize capability).

```
objHandle=Activator.CreateInstance(assembly, classname);
Xmlserializer serializer=new
XmlSerializer(objHandle.Unwrap( ).GetType( )/*
otherTypes*/);
if (s is Stream)
   return serializer.Deserialize((Stream)s) as Exportable;
else if (s is TextReader)
   return serializer.Deserialize ((TextReader) s) as Exportable;
else
   throw new Exception("Unexpected type to read from");
```

Listing 4

In one configuration, all the types that have been predefined with the web service 312 and any types that were dynamically added after the web service 312 was installed may be listed. This may be accomplished by looking in a database of types and their associated assemblies. Additionally or alternatively, this could be stored in a configuration (e.g., config) file as well. This may be done in case a newly derived class references multiple other newly derived classes that were not defined when the web service 312 was built. For example, as the .Net deserializer goes along finding new types, it will not fail as long as it finds an instance of those types already provided (e.g., by loading the appropriate assemblies and instantiating default instances of each type to pass in that list of "otherTypes").

An example of a load method 356 is illustrated below in Listing 5.

```
[WebMethod]
public byte[ ] LoadExportableFromDatabase(string guid,
   out string assemblyname, out string classname)
{
```

Listing 5

The examples in Listings 2, 4 and 5 illustrate using the system's ability to construct a class based on dynamic assembly and class name information. Using this, the base class 314 can instantiate a version of itself that can understand a derived class (e.g., of the "Exportable" class) even though it was not defined when the code for the web service 112 was written. The load method in Listing 5 may provide functionality that is opposite from a save method. For example, a byte stream may be passed to the web service 312 to save as a "query." Later, the web service 312 may receive a request for the query named "xyz" or the query with guid "guid123," for instance. The web service 312 may then load and return a byte stream.

Although the save method 354 and load method 356 are illustrated as examples, other methods may be included in the base class 314 and implemented by the method implementations 358. The base class 314 may be referred to as a "common" base class 314. The functionality or signatures of this "common" base class 314 may be inherited, implemented and/or overridden by one or more new derived classes 344. Developers may derive the classes 344 they wish to remotely instantiate and call from this common base class 314.

Using the new derived class 344 (i.e., including its method implementations 358) and the base class 314 (i.e., include its save 354 and load 356 methods), the web service 312 may generate the new derived class instance 316. The new derived class instance 316 may be used to modify one or more records in one or more database tables 352 in the database 350. Additionally, the new derived class instance 316 may also be used to modify one or more files 362 in the file system 360. The new derived class instance 316 may be used to perform some desired operation on the administrative system 310.

There may be many types of classes that can be remotely instantiated in the manner discussed. These classes typically implement load 356 and save 354 methods for themselves by interacting with the database 350 and/or the file system 360 on the administrative system 310. It may be desirable to remotely instantiate these classes and use their load 356 and save 354 methods. However, it may be a burden to create web service 312 methods to expose remote access to each and every object's methods. To simplify the load and save complexity, each of the objects derive from a common base class 314. The web service 312 may then expect parameters associated with the base class 314.

In order for remote method invocation to work, the parameters for that method may be well-described and serializable to some common byte-stream format. In one configuration, a Web Service Description Language (WSDL) describes how to serialize the method calls and parameters in Extensible Markup Language (XML) for Hypertext Transfer Protocol-based (HTTP-based) Simple Object Access Protocol (SOAP) requests. The remote node 302 may format a byte-stream of XML-encoded data and submit it to the administrative system for processing. It may also receive a similarly encoded response.

Figure 4:
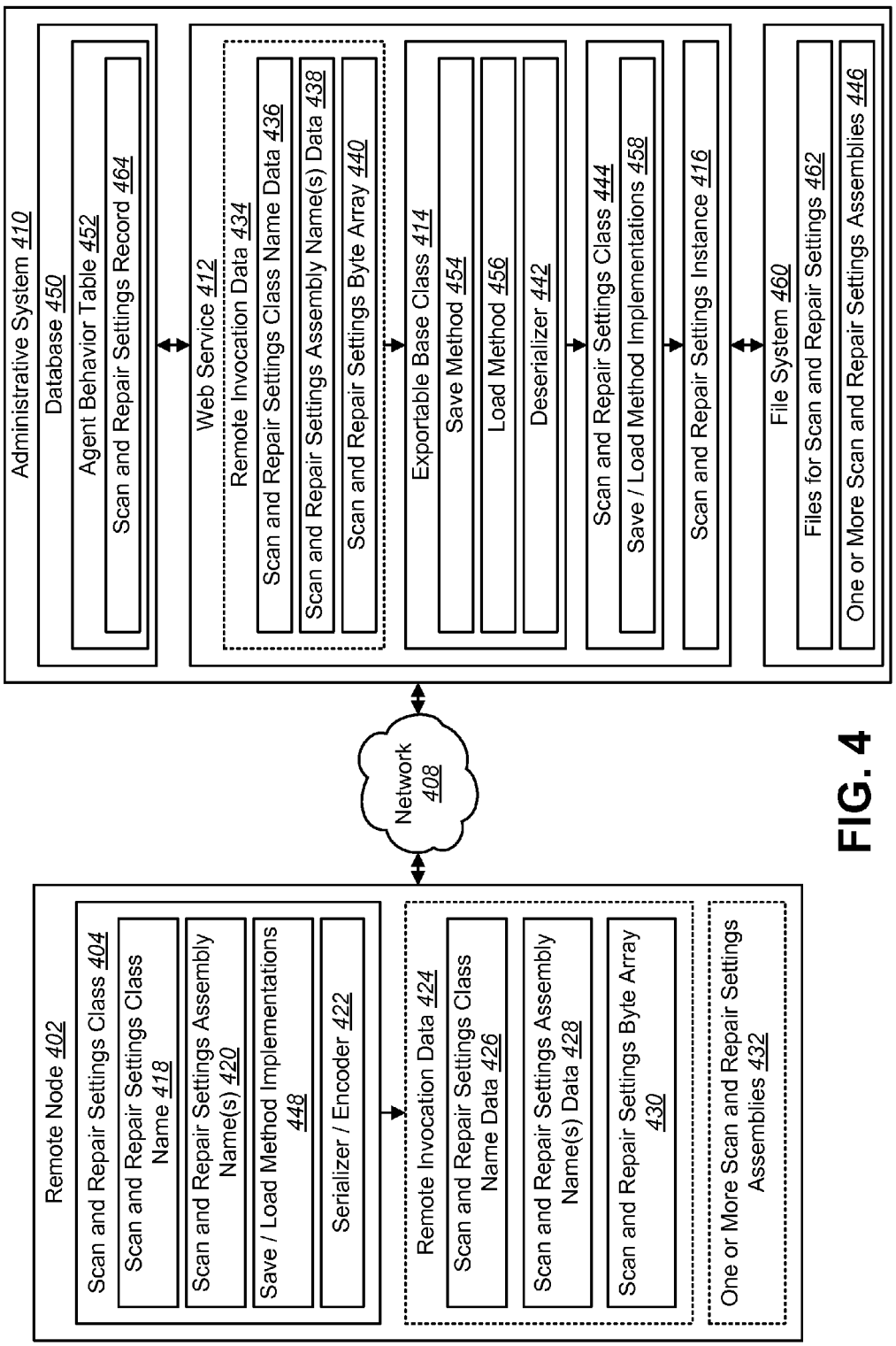
FIG. 4 is a block diagram illustrating one example of systems and methods for remotely invoking dynamic classes on a computing device.

FIG. 4 is a block diagram illustrating one example of systems and methods for remotely invoking dynamic classes on a computing device. In this example, the remote node 402 includes a scan and repair settings class 404, which is a new class derived from the Exportable base class 414. The scan and repair settings class 404 includes its scan and repair settings class name 418 and scan and repair settings assembly name(s) 420. It also includes save and load method implementations 448 and a serializer 422. The remote node 402 extracts the class name 418 and the assembly name(s) 420 from the scan and repair settings class 404. Some properties in the Exportable base class 414 provide a way to extract the class 418 and assembly names 420. An example of these properties is shown in Listing 6 below.

```
[XmlElement("ClassName")]
public string ClassNameWhenExporting
{
    get
    {
        if (!_exporting)
            return null;
        return ClassName;
    }
    set
    {
        ClassName = value;
    }
}
[XmlIgnoreAttribute]
public string ClassName
{
    get
    {
        if (string.IsNullOrEmpty(_classname))
        {
            _classname = this.GetType( ).ToString( );
        }
        Return _classname;
    }
    set
    {
        _classname = value;
    }
} protected string _classname;
[XmlElement("AssemblyName")]
public string AssemblyNameWhenExporting
{
    get
    {
        if (!_exporting}
            return null;
        return AssemblyName;
    }
    set
    {
        AssemblyName = value;
    }
}
[XmlIgnoreAttribute]
public string AssemblyName
{
    get
    {
        if (string.IsNullOrEmpty(_assembly))
        {
            Assembly a = Assembly.GetAssembly(this.Gettype( ));
            AssemblyName an = a.Getname( );
            _assembly = an.Name;
        }
```

```
        return _assembly;
    }
    set
    {
        _assembly = value;
    }
} private string assembly;
```

Listing 6

The class name data 426 and assembly name(s) data 428 are included in the remote invocation data 424 on the remote node 402. The serializer 422 converts the scan and repair settings class 404 into a scan and repair settings byte array 430, which is also included in the remote invocation data 424. The remote invocation data 424 may be sent over the network 408 to the administrative system 410. The one or more scan and repair settings assemblies 432 may also be optionally sent over the network 408 to the administrative system.

The administrative system 410 receives and stores the one or more scan and repair settings assemblies 432 in the file system 460 if they are sent. Optionally, the one or more scan and repair settings assemblies 446 may be deployed from some other location. In either case, the one or more scan and repair settings assemblies 446 are stored in the file system 460 on the administrative system 410. The administrative system 410 also receives the scan and repair settings byte array 440, the scan and repair settings class name data 436 and the scan and repair settings assembly name data 438. This information may be received as parts of the remote invocation data 434 on the administrative system 410.

The scan and repair settings byte array 440 is deserialized by the deserializer 442 that is included in the Exportable base class 414. The Exportable base class 414 also includes a save method 454 and a load method 456. The deserialized (e.g., or reconstituted) scan and repair settings class 444 on the administrative system includes implementations 458 for these save 454 and load 456 methods.

The scan and repair settings class 444 comprises, for example, a scan and repair settings record 464 in the agent behavior table 452 in the database 450. The scan and repair settings class 444 also comprises one or more files for scan and repair settings 462 included in the file system 460. The web service 412 generates an instance 416 of the scan and repair settings class 444. In this way, the unreferenced derived scan and repair settings class 404 can be remotely instantiated. Once an instance 416 of the scan and repair settings class 444 is generated, the save 454 and load 456 methods may be utilized.

In one example, a remote node 402 may be able to pass a new "scan and repair" setting to the administrative system 410 using the administrative system's 410 web service 412 and ask it to "save itself" at the administrative system 410. This may update a database on the administrative system and may update one or more files (e.g., in a Hypertext Transfer Protocol (HTTP)-accessible directory on the administrative system 410. This HTTP-accessible directory may be accessed by nodes on the network (e.g., remote node 102, managed nodes 106, etc.) when they perform their management activities. Each node may download the newly saved scan and repair settings and abide by them. Thus, two main features that may be used according to the systems and methods disclosed herein are "Load" and "Save" functionalities. The save functionality may be particularly useful since it may do more than just write to a database.

Figure 5:
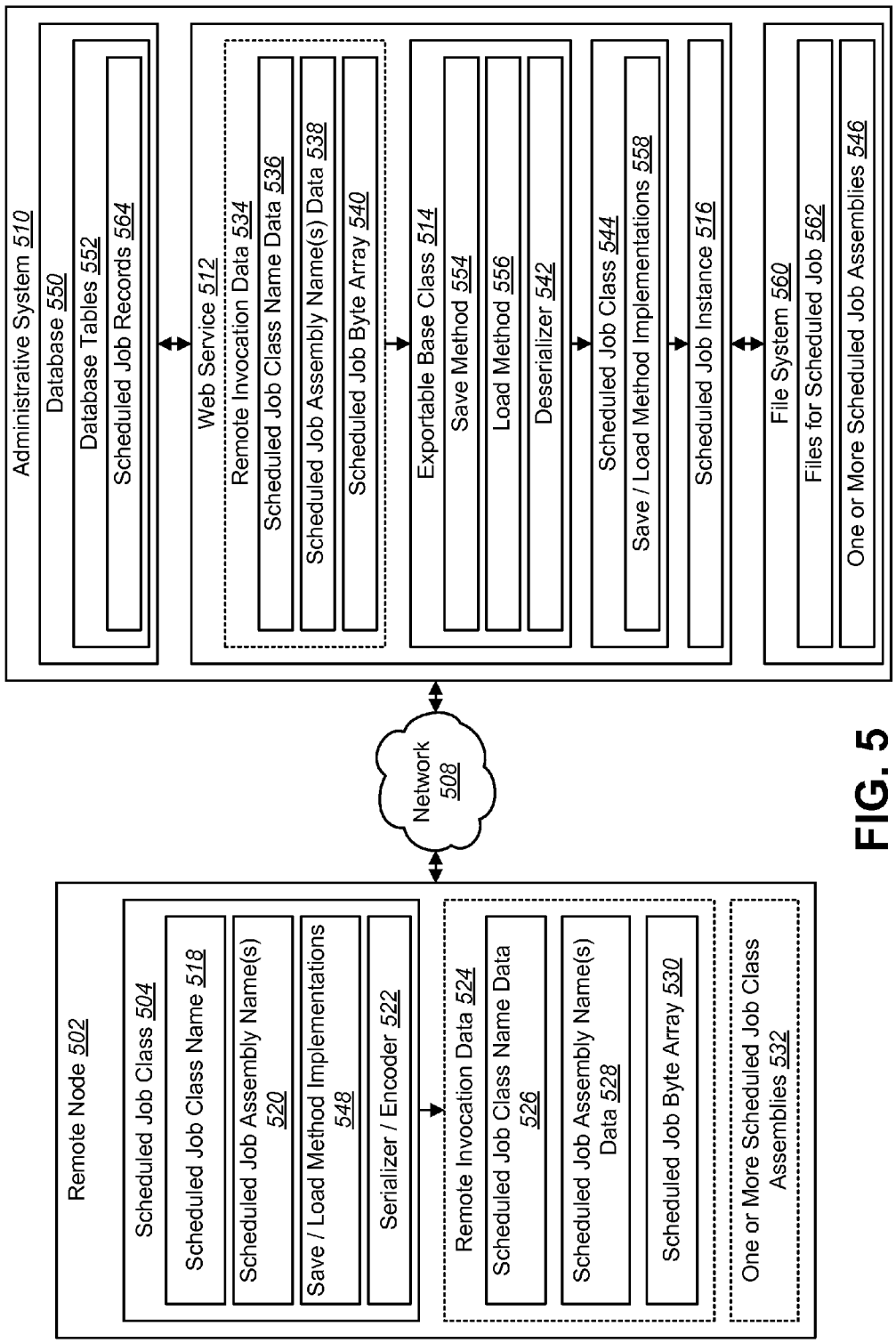
FIG. 5 is a block diagram illustrating another example of systems and methods for remotely invoking dynamic classes on a computing device.

FIG. 5 is a block diagram illustrating another example of systems and methods for remotely invoking dynamic classes on a computing device. In this example, the remote node 502 includes a scheduled job class 504, which is a new class derived from the Exportable base class 514. The scheduled job class 504 includes its scheduled job class name 518 and scheduled job assembly name(s) 520. It also includes save and load method implementations 548 and a serializer 522. The remote node 502 extracts the class name 518 and the assembly name 520 from the scheduled job class 504. The class name data 526 and assembly name data 528 are included in the remote invocation data 524 on the remote node 502. The serializer 522 converts the scheduled job class 504 into a scheduled job byte array 530. The remote invocation data 524 may be sent over the network 508 to the administrative system 510. The one or more scheduled job assemblies 532 may also be optionally sent over the network 508.

The administrative system 510 receives and stores the one or more scheduled job assemblies 532 in the file system 560, if they are sent. The one or more scheduled job assemblies 546 are stored in the file system 560 on the administrative system 510. The administrative system 510 also receives the scheduled job byte array 540, the scheduled job class name data 536 and the scheduled job assembly name(s) data 538. This information may be received as parts of the remote invocation data 534 on the administrative system 510.

The scheduled job byte array 540 is deserialized by the deserializer 542. The Exportable base class 514 also includes a save method 554 and a load method 556. The deserialized (e.g., or reconstituted) scheduled job class 544 on the administrative system includes implementations 558 for these save 554 and load 556 methods.

The scheduled job class 544 comprises, for example, one or more scheduled job records 564 in database tables 552 in the database 550. In this example, the scheduled job class 544 comprises database records 564 for task configuration, delivery methods, target queries and target computers. The scheduled job class 544 also comprises one or more files for the scheduled job class 562 included in the file system 560. The web service 512 generates an instance 516 of the scheduled job class 544. In this way, the unreferenced derived scheduled job class 504 can be remotely instantiated. Once an instance 516 of the scheduled job class 544 is generated, the save 554 and load 556 methods may be utilized. In one example, a "task" object may be saved, with its settings and target (e.g., node) information. This may cause a scheduler program on the administrative system 510 to operate on those targets (e.g., nodes) with those settings.

Figure 6:
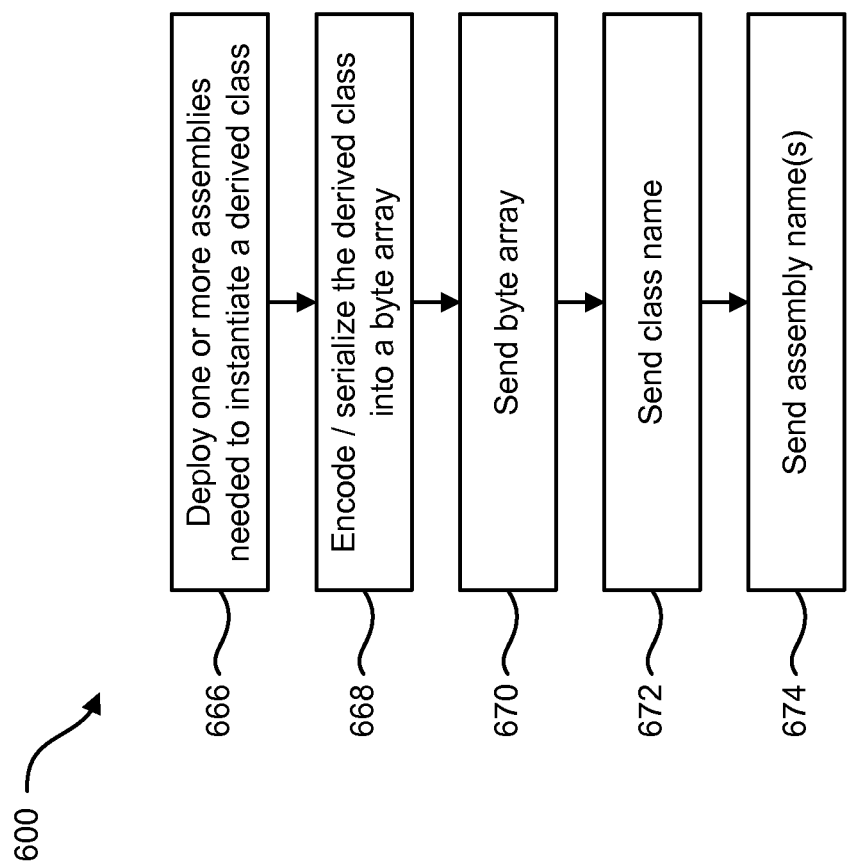
FIG. 6 is a flow diagram illustrating one configuration of a method for remotely invoking dynamic classes on a computing device or remote node.

FIG. 6 is a flow diagram illustrating one configuration of a method 600 for remotely invoking dynamic classes on a computing device or remote node 102. A remote node 102 may optionally deploy 666 (e.g., or send generated) one or more assemblies 232 to the web service 112 needed to instantiate a new derived class 104. For example, a new derived class 104 may use one or more assemblies (e.g., dynamic link libraries or DLL files) 232 in order to function.

These assemblies 232 may be included on a remote node 102 where a new derived class 104 is created. The one or more assemblies 232 may be sent to the administrative system 110 where they are stored for use.

The remote node 102 may encode or serialize 668 a new derived class 104 as a byte array 230 (e.g., or byte stream). In one configuration, a serializer 222 module is part of the new derived class 104. In another configuration, the serializer 222 module is separate from the new derived class 104. The remote node 102 may use this serializer 222 to convert the new derived class 104 into a byte array 230. The remote node 102 may send 670 or pass the byte array 230 over the network 108 to the administrative system 110. Additionally, the remote node 102 may send 672 or pass the class name 226 of the new derived class 104 to the administrative system 110. The assembly names 228 of the one or more assemblies 246 used by the new derived class 104 may also be sent 674 or passed to the administrative system 110 over the network 108. More specifically, the byte array 230, the class name 226 and the assembly name 228 may be passed as parameters to the web service 112 that is to perform some operation with the object. For example, this may be a remoting mechanism for the caller. More specifically, the web service 112 may be configured to know about new objects (e.g., class instances) that the caller already knows about. In some configurations, this may not be very dynamic. However, the systems and methods disclosed herein may avoid the necessity of rebuilding the web service 112 whenever a new Exportable object is defined.

Performing the method 600 illustrated in FIG. 6 may allow the new derived class 104 to be remotely instantiated on the administrative system 110. An example of the methods used on the remote node 102 is illustrated in Listing 7 below.

ry=cr.SaveExportableToDatabase(this.ExportTobyteArray( ) this.AssemblyName, this.ClassName, failIfCoresDontMatch, saveAllReferences);

Listing 7

Figure 7:
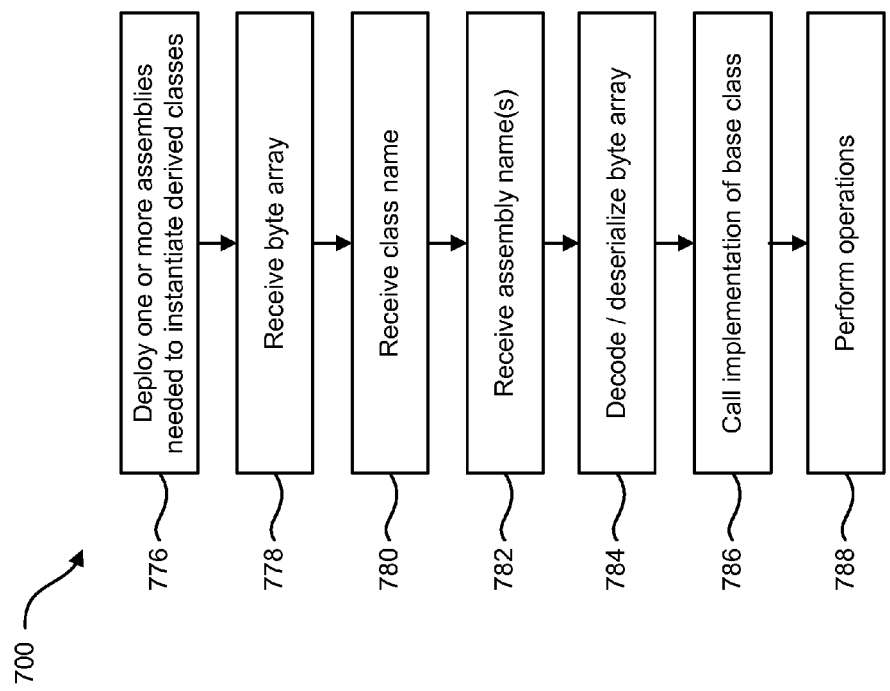
FIG. 7 is a flow diagram illustrating another configuration of a method for remotely invoking dynamic classes on a computing device or administrative system.

FIG. 7 is a flow diagram illustrating another configuration of a method 700 for remotely invoking dynamic classes on a computing device or administrative system 110. The administrative system 110 may deploy 776 one or more assemblies needed to instantiate a new derived class 104. In this context, the administrative system 110 may deploy 776 the one or more assemblies by receiving and storing the one or more assemblies 246 from a remote node 102. The administrative system 110 may otherwise obtain the one or more assemblies 246 needed to instantiate the new derived class 104.

In one configuration, the administrative system 110 may deploy 776 the one or more assemblies by receiving, installing and generating a record of which classes are included in which (assembly) files. For example, this may be done at a setup time by updating a database table that lists the information. One example of a database table is illustrated in Table 1 below.

TABLE 1

| ID | Assembly Name | Class Name | Sync Enabled | Show In UI | Allow Auto Sync | Group Key |
|---|---|---|---|---|---|---|
| 1 | LANDesk.ManagementSuite.Data | LANDesk.ManagementSuite.Data.EBootEnvironmentGroup | 0 | 0 | 0 | |

TABLE 1-continued

| ID | Assembly Name | Class Name | Sync Enabled | Show In UI | Allow Auto Sync | Group Key |
|---|---|---|---|---|---|---|
| 2 | LANDesk.ManagementSuite.Data | LANDesk.ManagementSuite.Data.EChassisGroup | 0 | 0 | 0 | |
| 3 | LANDesk.ManagementSuite.Data | LANDesk.ManagementSuite.Data.EColumnSetGroup | 0 | 0 | 1 | QRY |
| 4 | LANDesk.ManagementSuite.Data | LANDesk.ManagementSuite.Data.EComputerGroup | 0 | 0 | 0 | |
| 5 | LANDesk.ManagementSuite.Data | LANDesk.ManagementSuite.Data.EDynamicGroup | 0 | 0 | 0 | |
| 6 | LANDesk.ManagementSuite.Data | LANDesk.ManagementSuite.Data.EOSDGroup | 0 | 0 | 0 | |
| 7 | LANDesk.ManagementSuite.Data | LANDesk.ManagementSuite.Data.EPackageGroup | 1 | 0 | 1 | PKG |
| 8 | LANDesk.ManagementSuite.Data | LANDesk.ManagementSuite.Data.EProductGroup | 0 | 0 | 0 | |
| 9 | LANDesk.ManagementSuite.Data | LANDesk.ManagementSuite.Data.EProvisioningTemplateGroup | 0 | 0 | 0 | |
| 10 | LANDesk.ManagementSuite.Data | LANDesk.ManagementSuite.Data.EQueryGroup | 0 | 0 | 1 | QRY |
| 11 | LANDesk.ManagementSuite.Data | LANDesk.ManagementSuite.Data.EQuery | 0 | 1 | 1 | QRY |
| 12 | LANDesk.ManagementSuite.Data | LANDesk.ManagementSuite.Data.EReportGroup | 0 | 1 | 1 | RPT |
| 13 | LANDesk.ManagementSuite.Data | LANDesk.ManagementSuite.Data.EReport | 0 | 0 | 1 | RPT |
| 14 | LANDesk.ManagementSuite.Data | LANDesk.ManagementSuite.Data.EScriptGroup | 0 | 0 | 1 | SCR |
| 15 | LANDesk.ManagementSuite.Data | LANDesk.ManagementSuite.Data.ESLMProductGroup | 0 | 0 | 0 | |
| 16 | LANDesk.ManagementSuite.Data | LANDesk.ManagementSuite.Data.EStaticGroup | 0 | 0 | 0 | |
| 17 | LANDesk.ManagementSuite.Data | LANDesk.ManagementSuite.Data.ETaskUserGroup | 1 | 0 | 1 | TSK |

The administrative system 110 may receive 778 a new derived class byte array 240 from a remote node 102. Furthermore, the administrative system 110 may receive 780 the new derived class name 236 and may receive 782 the names 238 of any assemblies to be used by the new derived class 244. The new derived class byte array (e.g., or stream) 240 may then be deserialized or decoded 784 on the administrative system 110. This may reconstitute the byte array 240 into the new derived class 244. The administrative system 110 may then call 786 the implementation 358 of a common base class 214. For example, the new derived class 104 contains method implementations 358 that may implement methods included in a common base class 214. The base class 214 is referred to as "common" since it can be implemented by many classes. By calling 786 the implementation of the base class 214, the new derived class 244 may thus be instantiated 216. Once the new derived class 244 is instantiated, the administrative system 110 may perform 788 operations specified by the new derived class 244. In short, the web service 112 uses the class name 236 and assembly information 238 to dynamically deserialize 784 the byte array (e.g., byte stream) back into its class 244 and then call its implementation 358 of the base class 214 to perform the specified operation. For example, the save method 354 may be used when the new derived class 104 is passed from the caller (e.g., remote node 102) to save to a database on the administrative system 110. The load method 356 may be used when the caller (e.g., remote node 102) would like to get something out of a database on the administrative system 110 (hosted by the web service 112). In one configuration, the new derived class 244 (e.g., new derived class instance 216) may just call the base class's 214 implementation of "OnSaveToDB" or may perform some other operation(s) first before "falling through" to the base class's 214 "OnSaveToDB". For instance, it may be assumed in some configurations that the new derived class 244 (e.g., new derived class instance 216) will call the base class's 214 version no matter what operations it performs before or after that act.

Figure 8:
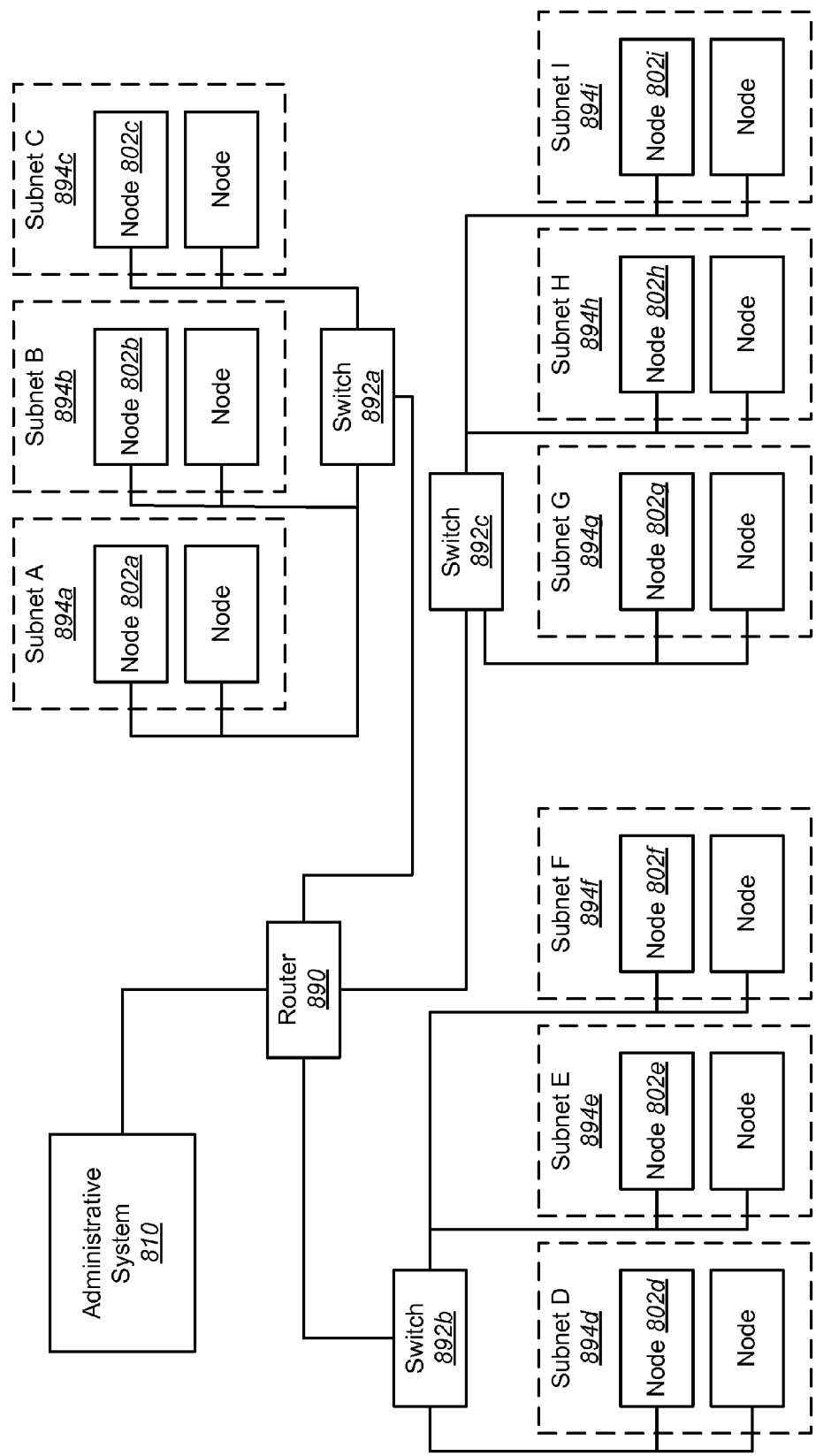
FIG. 8 is a block diagram that illustrates one configuration of a network where a system for remotely invoking dynamic classes on a computing device may be implemented.

FIG. 8 is a block diagram that illustrates one configuration of a network where a system for remotely invoking dynamic classes on a computing device may be implemented. An administrative system 810 is connected to a router 890. The router 890 is connected to switches 892*a*, 892*b*, 892*c*. The switch 892*a* is connected to several nodes 802*a*, 802*b*, 802*c*, etc. via their respective subnets 894*a*, 894*b*, 894*c*. The switch 892*b* is connected to several nodes 802*d*, 802*e*, 802*f*, etc. via their respective subnets 894*d*, 894*e*, 894*f*. The switch 892*c* is connected to several nodes 802*g*, 802*h*, 802*i*, etc. via their respective subnets 894*g*, 894*h*, 894*i*. The nodes 802 may be, for example, remote nodes 102 and/or managed nodes 106. Although FIG. 8 only shows one router 890 and a limited number of switches 892, subnets 894 and nodes 802, many and varied numbers of routers 890, switches 892, subnets 894 and nodes 802 may be included in networks and/or systems where a system for remotely invoking dynamic classes on a computing device may be implemented.

Figure 9:
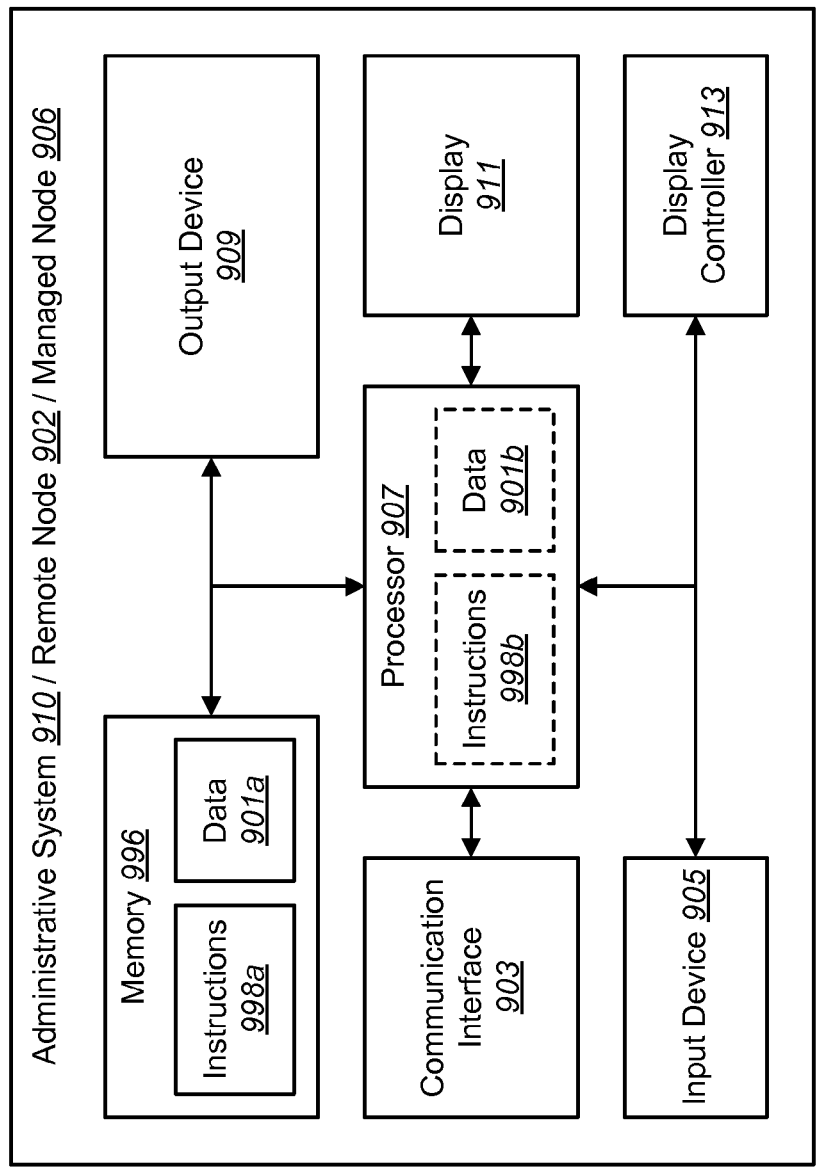
FIG. 9 illustrates various components of a computing device.

FIG. 9 illustrates various components that may be utilized in an administrative system 910, remote node 902 and/or a managed node 906. The illustrated components may be located within the same physical structure or in separate housings or structures.

The administrative system 910, remote node 902 and/or managed node 906 may include a processor 907 and memory 996. The memory 996 may include instructions 998*a* and data 901*a*. The processor 907 controls the operation of the administrative system 910, remote node 902 and/or managed node 906 and may be, for example, a microprocessor, a microcontroller, a digital signal processor (DSP) or other device known in the art. The processor 907 typically performs logical and arithmetic operations based on program instructions 998b and/or data 901b it loads from the memory 996.

The administrative system 910, remote node 902 and/or managed node 906 typically may include one or more communication interfaces 903 for communicating with other electronic devices. The communication interfaces 903 may be based on wired communication technology, wireless communication technology or both. Examples of different types of communication interfaces 903 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The administrative system 910, remote node 902 and/or managed node 906 typically may include one or more input devices 905 and one or more output devices 909. Examples of different kinds of input devices 905 include a keyboard, mouse, microphone, remote control device, button, joystick, trackball, touchpad, lightpen, etc. Examples of different kinds of output devices 909 include a speaker, printer, etc. One specific type of output device which may be typically included in a computer system is a display device 911. Display devices 911 used with configurations disclosed herein may utilize any suitable image projection technology, such as a cathode ray tube (CRT), liquid crystal display (LCD), light-emitting diode (LED), gas plasma, electroluminescence, or the like. A display controller 913 may also be provided, for converting data stored in the memory 996 into text, graphics and/or moving images (as appropriate) shown on the display device 911.

Of course, FIG. 9 illustrates only one possible configuration of an administrative system 910, remote node 902 and/or managed node 906. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device that is configured for remotely invoking dynamic classes on a computing device using a .NET framework, comprising:

a processor;
memory in electronic communication with the processor;
instructions stored in the memory, the instructions being executable to:
 deploy one or more assemblies that comprise a library of shared functions, wherein the one or more assemblies are used by an unreferenced derived class, wherein deploying the one or more assemblies comprises updating a database table listing all assemblies corresponding to a common base class and all implemented classes that derive from the common base class, wherein the computing device does not allow remote instantiation of derived classes without one or more assembly references and a description of the derived classes at a build time of a web service;
 receive a byte array from a remote node, wherein:
  the byte array comprises a serialized version of the unreferenced derived class; and
  the unreferenced derived class comprises an implementation of the common base class;
 receive a class name from the remote node;
 receive one or more assembly names from the remote node;
 decode the byte array during deserialization of the unreferenced derived class to reconstitute the unreferenced derived class, wherein the web service uses the class name and the one or more assembly names, where each assembly comprises a dynamic link library (DLL) file, to dynamically deserialize the byte array;
 call the implementation of the common base class, wherein calling the implementation of the common base class instantiates the unreferenced derived class, wherein the computing device does not include a description of the unreferenced derived class and does not include a reference to the one or more assemblies used by the unreferenced derived class at the build time of the web service on the computing device; and
 perform one or more operations with the unreferenced derived class;
 wherein the computing device manages a plurality of managed nodes, and sends commands to the plurality of managed nodes to download and install software and to scan for security threats.

2. The computing device of claim 1, wherein the common base class includes a decoder used to decode the byte array to reconstitute the unreferenced derived class.

3. The computing device of claim 1, wherein the unreferenced derived class comprises one or more records in a database on the computing device.

4. The computing device of claim 3, wherein fields and properties of the unreferenced derived class are saved to a single row in the database.

5. The computing device of claim 1, wherein the unreferenced derived class comprises one or more files in a file system on the computing device.

6. The computing device of claim 1, wherein the unreferenced derived class is used to modify how the computing device manages the plurality of managed nodes on a network.

7. The computing device of claim 1, wherein the common base class includes one or more methods.

8. The computing device of claim 7, wherein the unreferenced derived class implements the one or more methods included in the common base class.

9. The computing device of claim 8, wherein the one or more methods comprise a save method and a load method.

10. The computing device of claim 1, wherein the byte array is a stream of UTF-8 (Universal Character Set Transformation Format—8-bit) characters or another character set that allows the stream to be saved as a file and browsed with an Extensible Markup Language (XML) editor.

11. A method for remotely invoking dynamic classes on a computing device using a .NET framework, comprising:
 deploying one or more assemblies that comprise a library of shared functions on the computing device, wherein the one or more assemblies are used by an unreferenced derived class, wherein deploying the one or more assemblies comprises updating a database table listing all assemblies corresponding to a common base class and all implemented classes that derive from the common base class, wherein the computing device does not allow remote instantiation of derived classes without one or more assembly references and a description of the derived classes at a build time of a web service;
 receiving a byte array from a remote node, wherein:
  the byte array comprises a serialized version of the unreferenced derived class; and
  the unreferenced derived class comprises an implementation of the common base class;
 receiving a class name from the remote node;
 receiving one or more assembly names from the remote node;
 decoding, on the computing device, the byte array during deserialization of the unreferenced derived class to reconstitute the unreferenced derived class, wherein the web service uses the class name and the one or more assembly names, where each assembly comprises a dynamic link library (DLL) file, to dynamically deserialize the byte array;
 calling, on the computing device, the implementation of the common base class, wherein calling the implementation of the common base class instantiates the unreferenced derived class, wherein the computing device does not include a description of the unreferenced derived class and does not include a reference to the one or more assemblies used by the unreferenced derived class at the build time of the web service on the computing device; and
 performing one or more operations with the unreferenced derived class on the computing device;
 wherein the computing device manages a plurality of managed nodes, and sends commands to the plurality of managed nodes to download and install software and to scan for security threats.

12. The method of claim 11, wherein the common base class includes a decoder used to decode the byte array to reconstitute the unreferenced derived class.

13. The method of claim 11, wherein the unreferenced derived class comprises one or more records in a database on the computing device.

14. The method of claim 11, wherein the unreferenced derived class comprises one or more files in a file system on the computing device.

15. The method of claim 11, wherein the unreferenced derived class is used to modify how the computing device manages the plurality of managed nodes on a network.

16. The method of claim 11, wherein the common base class includes one or more methods.

17. The method of claim 16, wherein the unreferenced derived class implements the one or more methods included in the common base class.

18. The method of claim 17, wherein the one or more methods comprise a save method and a load method.

19. A non-transitory tangible computer-readable medium for remotely invoking dynamic classes on a computing device using a .NET framework comprising executable instructions for:
- deploying one or more assemblies that comprise a library of shared functions, wherein the one or more assemblies are used by an unreferenced derived class, wherein deploying the one or more assemblies comprises updating a database table listing all assemblies corresponding to a common base class and all implemented classes that derive from the common base class, wherein the computing device does not allow remote instantiation of derived classes without one or more assembly references and a description of the derived classes at a build time of a web service;
- receiving a byte array from a remote node, wherein:
  - the byte array comprises a serialized version of the unreferenced derived class; and
  - the unreferenced derived class comprises an implementation of the common base class;
- receiving a class name from the remote node;
- receiving one or more assembly names from the remote node;
- decoding the byte array during deserialization of the unreferenced derived class to reconstitute the unreferenced derived class, wherein the web service uses the class name and the one or more assembly names, where each assembly comprises a dynamic link library (DLL) file, to dynamically deserialize the byte array; and
- calling the implementation of the common base class, wherein calling the implementation of the common base class instantiates the unreferenced derived class, wherein the computing device does not include a description of the unreferenced derived class and does not include a reference to the one or more assemblies used by the unreferenced derived class at the build time of the web service on the computing device;
- wherein the computing device manages a plurality of managed nodes, and sends commands to the plurality of managed nodes to download and install software and to scan for security threats.

\* \* \* \* \*